May 18, 1948. J. STANITZ 2,441,728
KITCHEN CABINET WITH EXTENSIBLE CUTTING BOARD
Filed March 26, 1945 2 Sheets-Sheet 1

Inventor
Jacques Stanitz

May 18, 1948.         J. STANITZ         2,441,728
KITCHEN CABINET WITH EXTENSIBLE CUTTING BOARD
Filed March 26, 1945         2 Sheets-Sheet 2

Inventor
Jacques Stanitz
By Frease and Bishop
Attorneys

Patented May 18, 1948

2,441,728

UNITED STATES PATENT OFFICE 2,441,728

KITCHEN CABINET WITH EXTENSIBLE CUTTING BOARD

Jacques Stanitz, Warren, Ohio, assignor to Mullins Manufacturing Corporation, Salem, Ohio, a corporation of New York Application March 26, 1945, Serial No. 584,944

1 Claim. (Cl. 312—186)

The invention relates to a kitchen cabinet and more particularly to a kitchen cabinet including a cutting board which may be used for slicing bread, cutting or chopping vegetables, trimming meats, attaching meat grinders, and the like.

Present day kitchens are equipped with various kinds of table tops and cabinets, but the table or cabinet tops are constructed of such materials that it is preferable not to clamp meat grinders and the like on the table top. Sliding shelf-type bread boards have been used in kitchens for many years but their construction and mounting ordinarily does not permit a meat grinder to be stably clamped and supported thereon. Other constructions have been proposed in which a bread board is hinged in some manner to some part of a kitchen cabinet, but, again, they are not sufficiently stable and rigid for properly mounting and using a meat grinder and the like thereon.

In any event, it is desirable to provide a cutting board construction utilizing and having the advantages of a sliding shelf-type bread board and mounted in association with a kitchen cabinet in such manner that the cutting board may be moved and firmly supported in a working position as a rigid stable structure upon which bread may be sliced; vegetables or other foods may be cut, chopped or pounded; meats may be cut, trimmed or pounded; and upon which a meat grinder, food mixer, or the like, may be rigidly and firmly mounted or supported.

Accordingly, it is a primary object of the present invention to provide a new cutting board construction for kitchen cabinets.

Furthermore, it is an object of the present invention to provide a rigid stable kitchen cabinet cutting board construction utilizing a sliding shelf-type bread board.

Also, it is an object of the present invention to provide a cutting board construction for a kitchen cabinet which may be supported in a rigid stable manner without creating waste space in the cabinet due to the mounting or support of the cutting board.

Likewise, it is an object of the present invention to provide a cutting board construction for a kitchen cabinet which may be concealed when not in use and which does not present an unattractive appearance when rigidly and stably mounted for use.

Moreover, it is an object of the present invention to provide a sliding shelf-type cutting board construction for a kitchen cabinet in which the board may be moved to extended working position and supported at each of its four corners in a stable manner leaving an unobstructed space beneath the extended board.

Also, it is an object of the present invention to provide an extensible cutting board construction for a kitchen cabinet on which a meat grinder or the like may be clamped, or a food mixer or the like supported, in a stable rigid condition.

Furthermore, it is an object of the present invention to provide an improved cutting board construction for a kitchen cabinet without materially increasing the cost of the cabinet.

Finally, it is an object of the invention to provide a new cutting board cabinet construction incorporating the foregoing desiderata, which may be readily fabricated, which avoids prior art difficulties, which satisfactorily solves problems existing in the art, and which incorporates the foregoing advantages in a simple, effective and inexpensive manner.

These and other objects and advantages apparent to those skilled in the art from the following description and claims may be obtained, the stated results achieved, and the described difficulties overcome, by the devices, constructions, arrangements, combinations, sub-combinations, parts and elements which comprise the present invention, the nature of which are set forth in the following general statement, a preferred embodiment of which—illustrative of the best mode in which the applicant has contemplated applying the principle—is set forth in the following description and shown in the drawings, and which are particularly and distinctly pointed out and set forth in the appended claims forming part hereof.

The nature of the improvements in cutting board cabinet construction may be stated in general terms as preferably including a cabinet having central opening doors hinged at their outer edges for swinging open to positions substantially parallel with the cabinet side walls, a sliding shelf-type cutting board mounted for sliding movement within the cabinet near the top thereof and adjacent the top edges of the doors, and means at the outer corners of the cutting board engageable with means on the doors, when the doors are open and the board is extended, locking the board to the doors to form a rigid stable extended cutting board structure having an unobstructed space therebelow.

By way of example, a preferred embodiment of the improved cutting board cabinet is illustrated in the accompanying drawings, forming part hereof wherein.

Similar numerals refer to similar parts throughout the various figures of the drawings.

Figure 1:
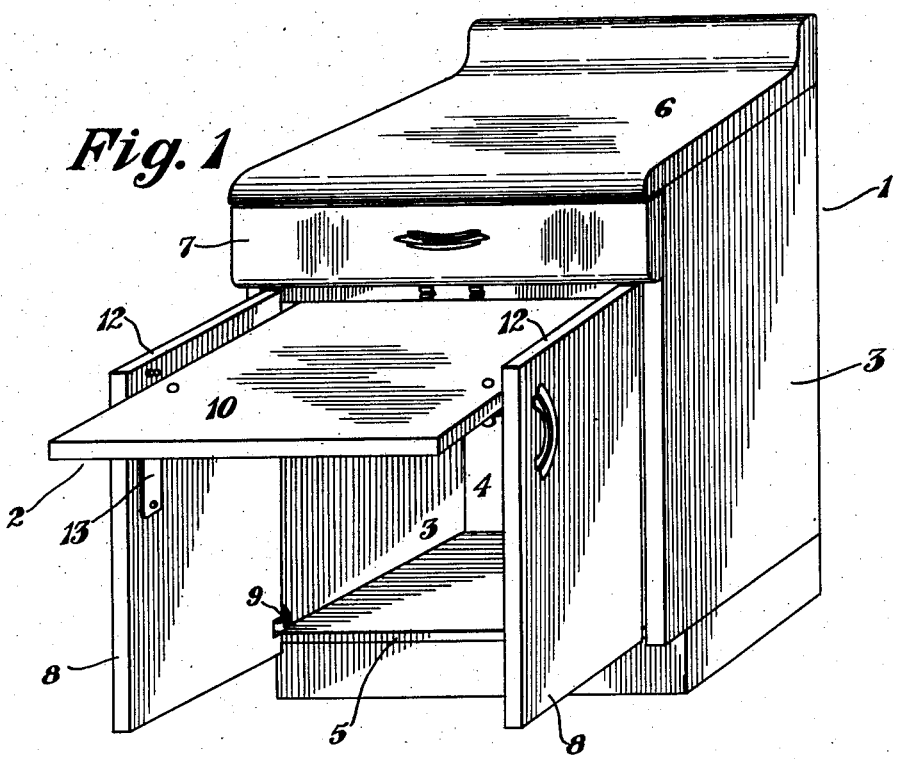
Figure 1 is a perspective view of a kitchen cabinet unit provided with the improved cutting board construction showing the cutting board extended and supported in a rigid manner as a stable structure.
Figure 4:
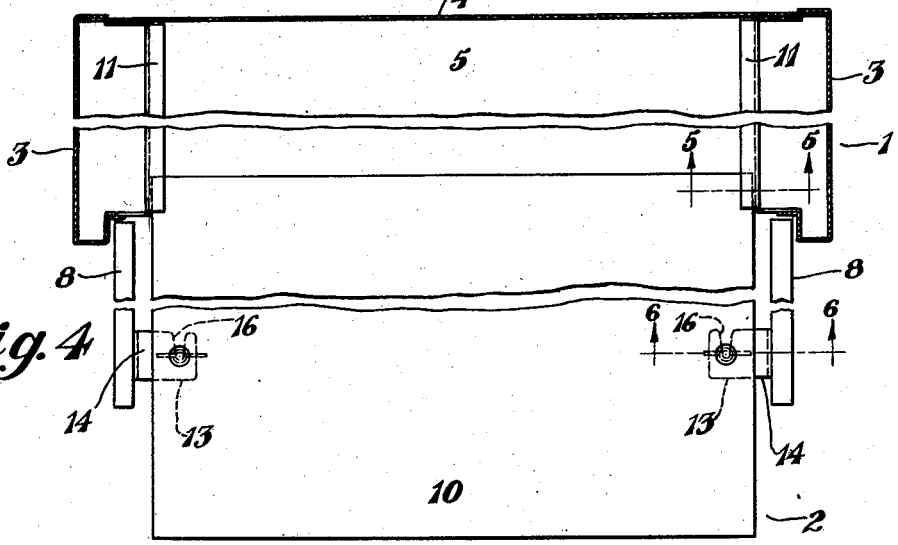
Fig. 4 is a plan sectional view taken on the line 4—4, Fig. 3.
Figures 5, 6, 7:
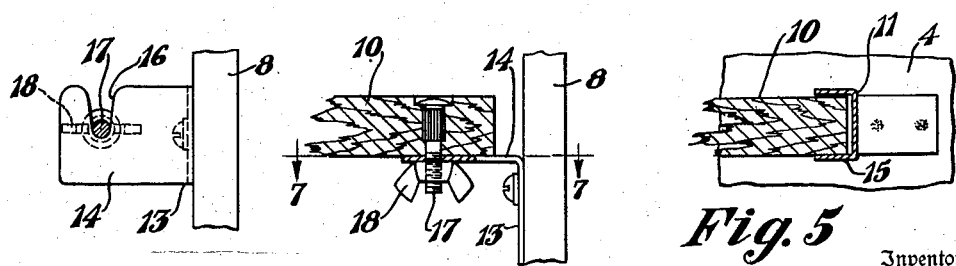
Fig. 5 is an enlarged section taken on the line 5—5, Fig. 4.
Fig. 6 is an enlarged section taken on the line 6—6, Fig. 4.
Fig. 7 is a section taken on the line 7—7, Fig. 6.

The kitchen cabinet indicated at 1 in Fig. 1 is provided with the improved cutting board construction generally indicated at 2. The cabinet 1 preferably includes side walls 3, a rear wall 4, a bottom wall and base 5, a top 6, and preferably an upper drawer 7. Outswinging, center opening doors 8 are hinged at 9 to the side walls 3 so that they may be opened in positions substantially parallel with the cabinet walls 3 as well illustrated in Figs. 1 and 4.

Figure 2:
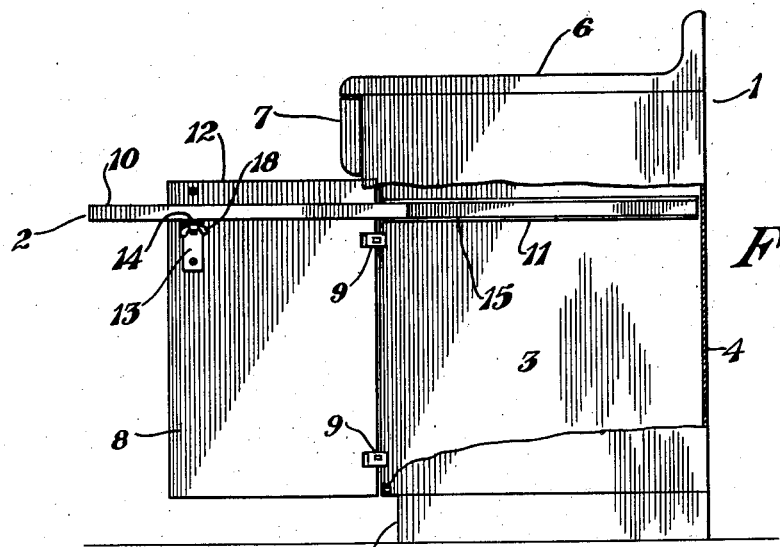
Fig. 2 is a side view of the cabinet illustrated in Fig. 1, with parts broken away and in section.
Figure 3:
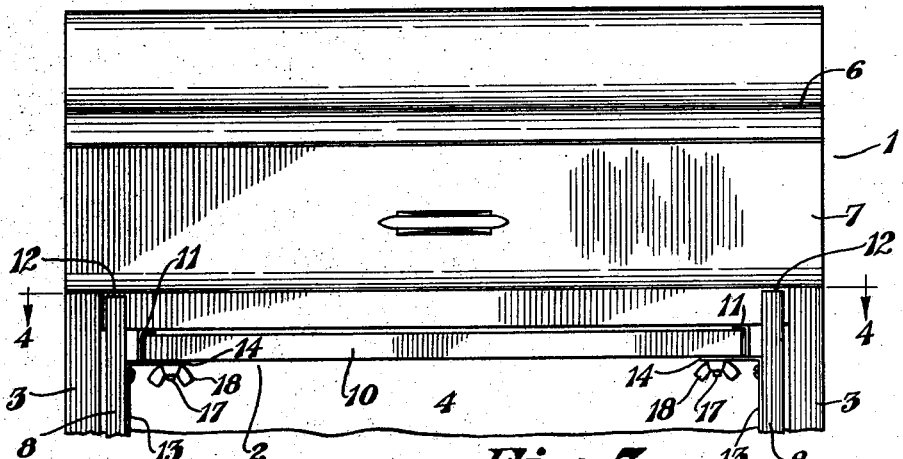
Fig. 3 is a fragmentary front view of the cutting board cabinet illustrated in Figs. 1 and 2.

A cutting board 10 of the sliding shelf-type has its longitudinal side edges mounted for sliding movement, preferably in channels 11 secured to the inner surfaces of the cabinet side walls 3 in such a manner that the board 10 may be extended to the position illustrated in Figs. 1 and 2, or may be pushed into the interior of the cabinet to permit the doors 8 to be closed. The cutting board 10 may be made in the usual manner of wood or other material ordinarily used for cutting boards, bread boards, meat chopping boards, and the like. Likewise, the cabinet 1 may be formed of any desired material, but is illustrated as being fabricated from sheet metal.

The channel guides or slides 11 for the cutting board 10 are located adjacent the top of the interior of the cabinet so that the board 10 occupies only a small amount of space when the board is pushed into the cabinet 1. When the cutting board 10 is extended to the position shown in Figs. 1 and 2, it is located near to the top edges 12 of the doors 8.

An L-shaped bracket 13 is mounted on the inner face of each door 8 adjacent the upper outer corner thereof when the door is open. The outstanding leg 14 of each bracket 13 is aligned with the lower flange 15 of the adjacent channel way 11 when the doors 8 are open. The bracket legs 14 are provided with notches 16 for receiving bolts 17 mounted in and extending downward from the bottom surface of the cutting board 10 adjacent the outer corners thereof when the board 10 is extended. Thumb nuts 18 may be associated with the bolts 17 for rigidly securing, clamping and locking the cutting board 10 to the angle brackets 13.

Thus, the cutting board 10 may be concealed within the interior of the cabinet 3 when the doors 8 are closed to present a neat appearance. When it is desired to use the cutting board, the doors 8 may be opened, the cutting board pulled out to the position shown in Figs. 1 and 2, the bolts 17 engaged in notches 16 and the nuts 18 tightened. Thus, when the cutting board 10 is locked to the two doors 8, a rigid stable structural unit is formed which has sufficient strength and stability to rigidly support a meat grinder or the like clamped or otherwise secured to the outer edge of the cutting board, or to support a food mixer and the like which may be placed upon the cutting board when the same is in extended position.

At the same time, the space beneath the cutting board is free and unobstructed so that a person may be seated on a chair to perform some operation on the extended cutting board 10 with ample leg room beneath the cutting board.

Accordingly, the present improvements provide a cutting board cabinet construction which is stable in use and which accomplishes all of the foregoing objects and avoids the described prior art difficulties.

In the foregoing description, certain terms have been used for brevity, clearness and understanding; but no limitations are to be implied therefrom beyond the requirements of the prior art, because such terms are utilized for descriptive purposes herein and not for the purpose of limitation, and are intended to be broadly construed. Moreover, the embodiment of the improved construction illustrated and described is by way of example and the scope of the present invention is not limited to the exact details of construction of the various parts.

Having described the features of the invention, the manufacture of a preferred embodiment of the improved cutting board cabinet construction, and the advantageous, new and useful results attained thereby; the new and useful devices, constructions, arrangements, combinations, sub-combinations, parts and elements, and reasonable mechanical equivalents thereof, obvious to those skilled in the art, are set forth in the appended claim.

I claim:

In cutting board cabinet construction, top, side, rear and bottom walls forming a cabinet, centrally opening doors hinged to the cabinet adapted to be swung to positions substantially parallel with the side walls, a slidable shelf-type cutting board having longitudinal side edges, channel slide members mounted on the cabinet side walls near the top thereof, the longitudinal side edges of the cutting board being slidably mounted in said channel slide members for sliding movement within the cabinet, an L-shaped bracket having a vertical leg mounted on the inner face of the upper outer corner of each door when open and each having an outstanding leg aligned with the lower flange of one of the channel members for supporting the board when extended, each outstanding leg having a notch therein, and bolt means projecting from the under side of each outer corner of the cutting board engageable with the brackets in said notches when the doors are opened and the board extended for locking the board to the doors to form a rigid, stable, extended cutting board structure.

JACQUES STANITZ.

REFERENCES CITED

The following references are of record in the file of this patent:

UNITED STATES PATENTS

| Number | Name | Date |
| --- | --- | --- |
| 484,121 | Stein | Oct. 11, 1892 |
| 1,184,380 | Ritter | May 23, 1916 |
| 1,313,364 | Williams | Aug. 19, 1919 |
| 1,479,721 | Liedtke | Jan. 1, 1924 |
| 1,725,816 | Miller | Aug. 27, 1929 |
| 1,919,986 | Powers | July 25, 1933 |